United States Patent Office 3,728,134
Patented Apr. 17, 1973

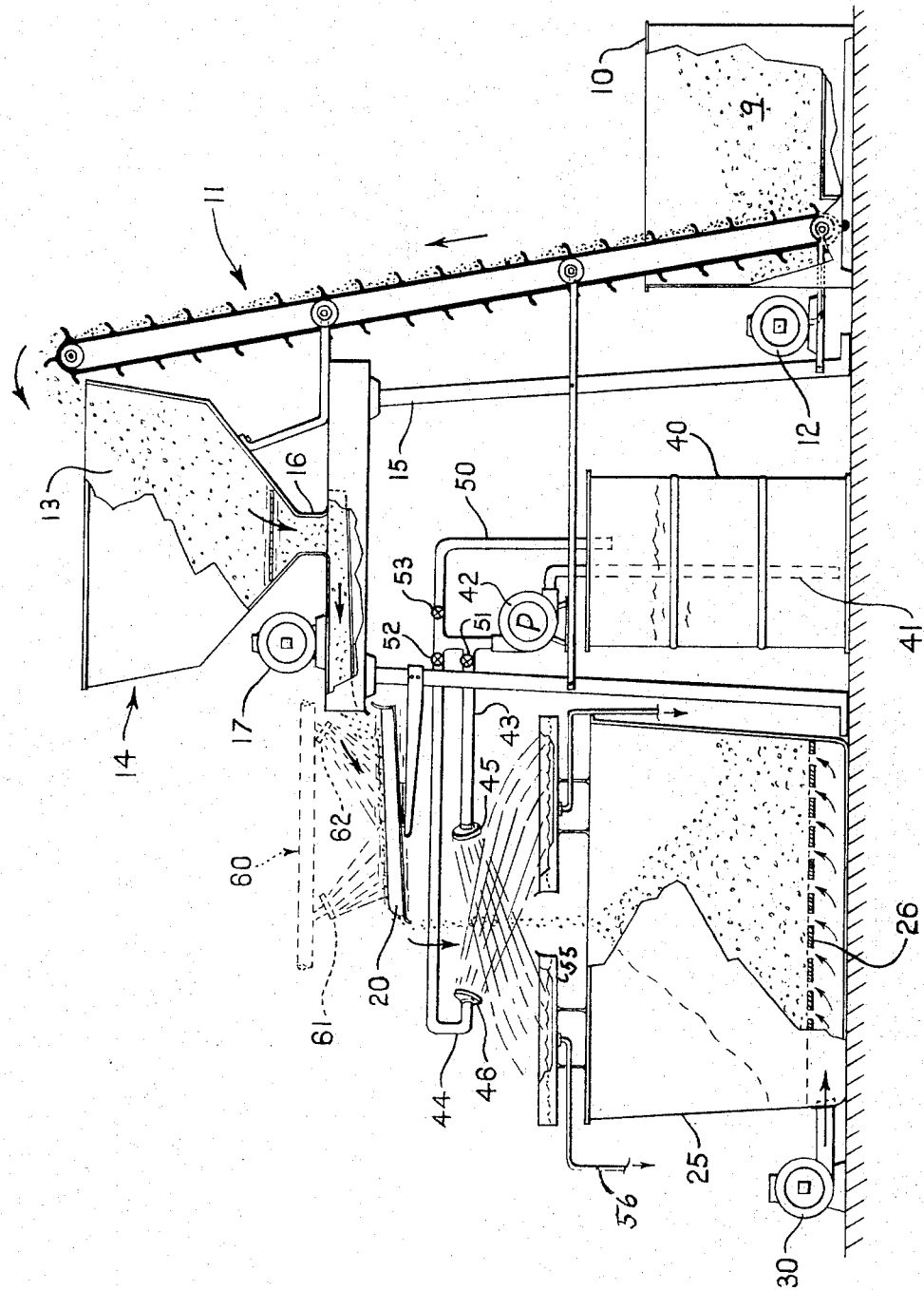

3,728,134
METHOD FOR REDUCING BACTERIA LEVEL OF DEHYDRATED ONION PRODUCTS WITH $H_2O_2$
Jerry Gilmore and John A. Scarlett, Modesto, Calif., assignors to Rogers Brothers Company, Livingston, Calif.
Filed Dec. 17, 1970, Ser. No. 99,005
Int. Cl. A23b 7/10, 7/02
U.S. Cl. 99—156    6 Claims

ABSTRACT OF THE DISCLOSURE

Dehydrated onion aspirations and screenings of high bacteria count are sprayed with an aqueous hydrogen peroxide solution of low concentration. On being dried in a heated air stream, onion pieces are obtained which may be ground into a dehydrated powder either alone or in a blend with other onion pieces. The treatment with peroxide has the effect of greatly reducing the total bacteria count of the resulting powder, while minimizing or eliminating bleaching and loss of color and flavor.

BACKGROUND OF THE INVENTION

Attempts have heretofore been made to produce a dehydrated onion powder of satisfactorily low bacteria level from onion pieces of low economic value such as aspirations (dried husks), roots and screenings from other onion processing operations. However, such materials frequently have bacteria levels which are well above the desired maximum of 100,000 (standard, total plate count) for a powdered onion product of satisfactory quality. Accordingly, many attempts have heretofore been made to reduce the bacteria levels of such onion pieces, while still providing an otherwise satisfactory product. In one such process the dehydrated onion pieces are treated with ethylene oxide, a method which is not only expensive but which has the further disadvantage of darkening the product. In another process, the onion pieces are treated by exposure to ultraviolet light, a treatment which proves to be impractical since the effect thereof is to sterilize only the outer surfaces of the onion pieces exposed to the light.

It is, therefore, a primary object of this invention to provide a bactericidally effective and economic method for producing low bacteria dehydrated onion pieces and onion powder from onion pieces such as roots, aspirations and the like which are normally characterized by bacteria levels of from 200,000 to 1,000,000 or more.

SUMMARY OF THE INVENTION

It has been discovered that dehydrated onion pieces, or those of other members of the allium family, which have an unduly high bacteria level can be converted to the corresponding products of an acceptably low bacteria level by the practice of a method whereby the said pieces are first sprayed with a dilute aqueous solution containing about 1.3 to 15 percent by weight of $H_2O_2$, and then dried to the desired moisture level. This treatment, while highly effective in reducing the bacteria content of the treated pieces and of powders or other products prepared therefrom, quite surprisingly has little if any effect on the flavor and appearance of the product.

While the method of the present inventions can be employed with all members of the allium family, including onions, garlic, leeks, chives and shallots, the principal raw materials with which this invention can most usefully be practiced are dehydrated onion aspirations, roots and screenings as separated and recovered in the processing of dehydrated chopped onions and the like. Many of these materials have been in direct contact with the soil, and the bacteria level thereof is, accordingly, well above the acceptable level of approximately 100,000 for the dehydrated onion product or the powder. In this connection, as well as elsewhere herein, the bacteria levels expressed have been determined by the standard, total plate count method.

In the interest of simplicity, the invention will be more particularly described below in connection with the processing of onion pieces.

In carrying out the present invention, dehydrated onion pieces of the type referred to above are sprayed with an aqueous hydrogen peroxide solution containing from about 1.3 to about 15 percent by weight $H_2O_2$. In general, the lower the bacteria level of the starting material, the lower the concentration of the peroxide solution to be employed. Thus, at bacteria levels of from about 125,000 to 500,000, the reduction to a bacterial level below 100,000 is preferably effected by using solutions containing from about 3 to 8 percent by weight of $H_2O_2$. On the other hand, when starting with materials having bacteria counts of the order of 750,000 to 1,000,000 or more, the solution may well contain from about 9 to 12 percent by weight of $H_2O_2$. Peroxide concentrations up to about 15 percent can be employed with onion pieces of an even higher bacteria content. The amount of peroxide solution which is sprayed onto the onion pieces should be such as to effectively wet the latter without producing an excessive runoff, and good results can be obtained using about 1.0 to 3 gallons of the aqueous peroxide solution per 100 pounds of the dehydrated onion starting material.

Following the step of spraying the onion pieces with the peroxide solution, the wet materials are dried to a moisture content of about 4.25 percent by weight, or below. This drying can be effected either in a continuous fashion, as by passing the product on a travelling belt through a heated oven or the like, or it can be accomplished by a batch drying procedure. In the latter case a stream of air heated to about 110° to 140° F. is passed upwardly through the moist onion pieces, care being taken to stir the mass from time to time to facilitate even drying.

In practicing the invention, it has been discovered that particularly good results can be obtained by placing the high bacteria dehydrated onion pieces in a suitable feeder bin such as a Syntron feeder, belt feeder, screw feeder, vibro screw or vibra belt unit, and then feeding the material from said bin onto a downwardly inclined shaking table or trough which can be either electrically or mechanically vibrated. The shaking action of the trough distributes the oven pieces evenly across the bottom surface as they are brought to a discharge point from which they fall into a receptical for drying. The peroxide solution can be sprayed onto the onion pieces as they pass along the trough, the shaking action having the effect of turning the pieces to permit of a relatively even application of the spray. However, in a preferred practice of the invention, the spray is directed against the onion pieces as they are in free fall from the trough to the receiving bin. By operating in this fashion, one avoids the difficulties such as particle sticking and the like which are encountered when the particles are sprayed as they pass along the trough. Further, the free fall spraying method insures that all surfaces of each onion piece receive an even application of the peroxide solution.

However the spray is applied, the wet, falling onion pieces can be recovered in a bin having a false screen or other regularly perforated bottom against which the onion pieces come to rest. When the bin has been filled to the desired level, hot air at temperatures of from about 110 to 140° F. can then be introduced into the chamber below said false bottom for uniform introduction into the overlying onion mass. The latter is turned from time to time as by a fork or the like as the drying continues to insure that all of the pieces are dried at a uniform rate. Samples can be withdrawn from the bin from time to time for moisture determination, and when the desired level of about 4.25 percent or less by weight is reached, the drying operation is discontinued and the pieces can then be ground in a conventional onion mill. If desired, the material can be mixed with other dehydrated onion pieces either before or after the peroxide treating step, with the mixture then being ground to a powder.

When practicing the present invention in connection, with onion materials of low economic value such as aspirations, screenings and the like, it is found that a powdered product having a bacterial count below 100,000, a good optical index and a maximum hot water insoluble solid content of 30 percent, can readily be produced. However, when it is desired to provide a powdered product of fancy grade, with a maximum hot water insoluble solid content of 20 percent, the aspirations and screenings are blended with from 30 to 70 percent of regular dehydrated onion pieces, usually before spraying with peroxide, though the mixing can take place after the aspirations and screenings have been subjected to the peroxide treatment.

The invention can be clearly understood by reference to the appended drawing which is a view in elevation, somewhat schematic in nature, of apparatus suitable for treating dehydrated onion pieces with peroxide and thereafter drying the same. In the drawing no attempt is made to indicate all valves, switches, connecting drives and the like since the location and placement thereof can readily be supplied by those skilled in the art.

Referring to the drawing, dehydrated onion pieces 9, as contained in a bin 10, are elevated by means of an endless bucket conveyor assembly 11, driven by motor 12, for discharge into the surge tank 13 of a feeder indicated at 14. The feeder, which is supported by a frame 15, is restricted inwardly towards its bottom to facilitate discharge of the onion pieces through a restricted section 16 to which a vibrating motion is imparted by a motor 17 in any conventional fashion adapted to prevent bridging of the onion pieces over the said section 16.

The onion pieces are discharged from feeder 14 onto a downwardly inclined vibrating trough 20 over which the onion pieces become evenly spread as they travel along the length of the trough. At the end of the trough the onion pieces fall into a receiving bin 25 provided with a false bottom screen 26 having a great many small holes therein which are large enough to readily permit passage of air, but exclude downward passage of the onion pieces. The space between the bottom 27 of bin 25 and the false bottom 26 is arranged for connection with an air blower 30 which supplies a stream of heated air into this space for drying the mass of wet onion pieces.

Shown at 40 is a tank adapted to contain the aqueous solution of hydrogen peroxide. A receiving pipe 41 leads from a position near the bottom of this tank to a pump 42 which pumps the peroxide solution through lines 43 and 44 to opposed spray nozzles 45 and 46 positioned on the respective sides of the free-falling stream of onion pieces from the trough 20. The spray pattern from these nozzles overlaps and insures that each falling onion particle is evenly covered with the peroxide solution. A return line 50 leads back to the tank and liquid from the pump flows back through this line rather than to the spray heads on proper actuation of the valves 51, 52 and 53. As indicated at 55, run-off troughs can be provided to collect excess peroxide spray, the liquid so collected being discharged via lines 56.

In an alternative arrangement, shown generally at 60 in dotted line, the peroxide solution supplied by the pump is discharged through nozzles 61 and 62 against the onion particles as they travel on trough 20. This arrangement, while capable of providing the requisite amount of peroxide to the onion pieces, has the disadvantage that many wet pieces tend to cling to the trough.

DESCRIPTION OF THE PREFERRED EMBODIMENTS

Example 1

Aspirations (450 pounds) having a bacteria count of 1,010,000, as measured by the standard plate count method, are fed through a Syntron vibrating feeder onto a stainless steel mechanically vibrating trough and sprayed as they pass along the trough with 8.5 percent $H_2O_2$ from two Spray Systems Company, No. 8001 nozzles at a pressure of 45 p.s.i.g., resulting in the feeding of 0.208 gallon per minute of hydrogen peroxide to 7.35 pounds of aspirations per minute. This represents a ratio of 24.2 pounds of 8.5 percent peroxide to 100 pounds of onion. The aspirations drop from the inclined vibrating trough into a bin with a perforated screen in the bottom. The bin is then connected to the hot air (120° F.) supply, where the onions are dried down to 4 percent moisture and then ground to powder in the onion mill. The ground product has a bacteria level of 64,500 and has a good appearance, as well as a good taste and odor.

Example 2

The process of Example 1 is repeated, but with the use of a peroxide solution of 12 percent by weight $H_2O_2$ rather than 8.5 percent. Further, the spray pressure is reduced so as to supply an amount of the peroxide solution equal to about 0.14 gallon per minute to 7.35 pounds per minute of the onion aspirations. Following drying, it is found that the resulting dehydrated material has a bacteria level which is well below 100,000, and is of good flavor. The peroxide at this concentration exerts a moderate bleaching action on the onion pieces.

Example 3

Onion screenings, 3 parts, to onion aspirations, 1 part, all having a bacteria content of about 167,000, are fed through an inclined screw conveyor to the surge tank of a vibra screw feeder, and from the feeder onto a stainless steel, electrically vibrated trough where the onions are sprayed with 4.25 percent $H_2O_2$ from two Spray Systems 8001 nozzles at a pressure of 20 p.s.i.g., resulting in the use of 0.14 gallon per minute of the peroxide solution to 7 pounds per minute of onions. This is a ratio of 16.8 pounds of the 4.25 percent peroxide per 100 pounds of onions. The moistened onions drop into a bin with a perforated screen in the bottom where they were dried at 120° F. to 3.1 percent $H_2O$. The resulting dehydrated onion pieces have a bacteria level of 29,000 and are of excellent quality.

Example 4

Aspirations admixed with screenings from milling dehydrated onions, and having a bacteria count of about 250,000, are fed into an inclined screw conveyor and carried to a surge tank of a vibra screw feeder which discharges the onion pieces into an inclined stainless steel mechanically vibrated trough. As the material is in free fall below the trough, it is sprayed with two opposing Spray Systems Company No. 8001 nozzles set at 12 inches from the front and the rear of the onion cascade at a pressure of 13.5 pounds per square inch, resuling in the use of 12 pounds of 4 percent $H_2O_2$ to 100 pounds of onions. This hydrogen peroxide solution is one which has previously been neutralized to a pH of 7 by adding 10.6 grams of sodium bicarbonate to 28 gallons of the peroxide solution to aid in the decomposition of any residual hydrogen peroxide in the dehydrated product. The onions moistened with hydrogen peroxide drop into a bin with a perforated screen in the bottom. The bin is then connected to a hot air supply where the onions are dried at 120° F. down to 3.65 percent moisture and ground to powder in the onion mill. The ground product four days after grinding has a bacteria count of 34,000. The odor and flavor of the powder are substantially unimpaired by the peroxide treatment.

Example 5

Onion screenings, 320 parts, to aspirations, 90 parts, and having a bacteria content of 324,000, are fed through an inclined screw conveyor to the surge tank of a vibra screw feeder and into a stainless steel electrically vibrated trough. The onion pieces are sprayed on the trough in the ratio of 24 pounds of 2.15 percent $H_2O_2$ to 100 pounds of onions by means of two Spray Systems Company No. 8001 nozzles set at 17.5 p.s.i.g., this being equivalent to 0.20 gallon per minute of peroxide to 7 pounds per minute of onions. The moistened onions drop into a bin with a perforated screen bottom and are there dried at 120° F. to 3.4 percent moisture. The product tests 56,000 standard plate count and has an excellent odor and flavor.

The processes of the above examples, while specifically dealing with dehydrated onion products, could be used to like good effect in reducing bacteria in other members of the allium family such as garlic, leeks, chives and shallots.

We claim:

1. A process for preparing dehydrated allium pieces having a bacteria level less than 100,000 (standard plate count method) from dehydrated allium pieces having a total bacteria count above said level, which comprises uniformly applying to said high bacteria allium pieces an aqueous solution of hydrogen peroxide having a concentration of from about 1.3 to 15 percent by weight $H_2O_2$, and then drying the resulting peroxide treated pieces to effect dehydration of the same.

2. The process of claim 1 wherein there is added the step of grinding the dried, peroxide-treated pieces to a powder characterized by a good flavor and appearance and a bacteria level below 100,000 (standard plate count method).

3. The process of claim 1 wherein the peroxide solution is sprayed onto dehydrated onion pieces as they are carried forward on a vibrating trough, and wherein the resulting peroxide bearing pieces are dehydrated to a moisture level below about 4.25 percent.

4. The process of claim 1 wherein the peroxide is sprayed onto onion pieces as they are in a condition of free fall, and wherein the resulting peroxide bearing pieces are dehydrated to a moisture level below about 4.25. percent.

5. The process of claim 1 wherein the peroxide solution is sprayed onto dehydrated onion pieces as they are in free fall from a raised position, wherein the peroxide-bearing pieces are received in a bin having a perforated false bottom, wherein the pieces in the bin are subjected to a current of heated air to lower the moisture content of the pieces to a level below about 4.25 percent, and wherein the resulting dehydrated pieces are converted to powder on an onion mill.

6. The process of claim 1 wherein sodium bicarbonate or other alkali is added to the hydrogen peroxide which is applied to the dehydrated allium pieces to aid in decomposition of residual peroxide on the dried, peroxide-treated allium pieces.

References Cited

UNITED STATES PATENTS

| | | | |
|---|---|---|---|
| 1,623,070 | 4/1927 | Rosenstein | 99—104 |
| 1,935,972 | 11/1933 | Zuckerman | 99—154 |
| 2,615,814 | 10/1952 | Geary | 99—156 |
| 2,799,096 | 7/1957 | Scott | 99—204 |
| 2,855,839 | 10/1958 | Teigen | 99—154 |
| 2,978,333 | 4/1961 | Teigen | 99—103 |
| 3,113,875 | 12/1963 | Prater | 99—204 |
| 3,008,839 | 11/1961 | Brunsing | 99—154 |
| 3,493,400 | 2/1970 | Truckenbrodt | 99—204 |

NORMAN YUDKOFF, Primary Examiner

M. G. MULLEN, Assistant Examiner

U.S. Cl. X.R.

99—104, 154, 204, 211, 222